(12) United States Patent
Kagawa et al.

(10) Patent No.: US 6,970,779 B2
(45) Date of Patent: Nov. 29, 2005

(54) VEHICLE SPEED CONTROL SYSTEM AND PROGRAM

(75) Inventors: Masakazu Kagawa, Inuyama (JP); Fumihiro Tamaoki, Tokai (JP); Akira Isogai, Anjo (JP)

(73) Assignee: Denso Corporation, Kariya (JP)

( * ) Notice: Subject to any disclaimer, the term of this patent is extended or adjusted under 35 U.S.C. 154(b) by 166 days.

(21) Appl. No.: 10/701,548

(22) Filed: Nov. 6, 2003

(65) Prior Publication Data

US 2004/0111209 A1 Jun. 10, 2004

(30) Foreign Application Priority Data

Nov. 25, 2002 (JP) .............................. 2002-340877
Nov. 26, 2002 (JP) .............................. 2002-342462

(51) Int. Cl.⁷ ............................................. G05D 1/00
(52) U.S. Cl. ........................... 701/93; 701/96; 701/70; 701/79; 701/23; 123/349; 180/170
(58) Field of Search .............................. 701/93, 96, 23, 701/70; 123/349; 180/170

(56) References Cited

U.S. PATENT DOCUMENTS

| | | | |
|---|---|---|---|
| 6,138,084 A | 10/2000 | Mine | |
| 6,163,741 A | 12/2000 | Matsuda et al. | |
| 6,169,952 B1 | 1/2001 | Matsuda et al. | |
| 6,208,927 B1 * | 3/2001 | Mine et al. | 701/70 |
| 6,343,253 B1 * | 1/2002 | Matsuura et al. | 701/200 |
| 6,385,528 B1 * | 5/2002 | Takahashi | 701/93 |

FOREIGN PATENT DOCUMENTS

| | | |
|---|---|---|
| JP | A-S60-89298 | 5/1985 |
| JP | A-H10-269499 | 10/1998 |
| JP | A-2002-96654 | 4/2002 |
| JP | A-2002-187509 | 7/2002 |

* cited by examiner

*Primary Examiner*—Yonel Beaulieu
(74) *Attorney, Agent, or Firm*—Posz Law Group, PLC

(57) ABSTRACT

In a vehicle speed control system, each node existing ahead of a vehicle is detected, and a stable running speed at which the vehicle runs stably when the vehicle passes over each node, and a deceleration needed to accelerate/decelerate the vehicle so that the vehicle speed becomes the stable running speed at each node by the time when the vehicle arrives at the node are successively calculated. On the basis of the deceleration at each node, a point at which the maximum deceleration value is achieved is selected, and the vehicle is subjected to deceleration control so that the vehicle speed becomes the stable running speed at the point. When a point at which the curve degree is maximum is different from a point at which the deceleration value is maximum and also the point is located ahead of the vehicle, further necessary deceleration control is carried out.

16 Claims, 9 Drawing Sheets

VEHICLE SPEED CONTROL SYSTEM AND PROGRAM

CROSS REFERENCE TO RELATED APPLICATION

This application is related to and incorporates herein by reference Japanese Patent Applications No. 2002-340877 filed on Nov. 25, 2002 and No. 2002-342462 filed on Nov. 26, 2002.

FIELD OF THE INVENTION

The present invention relates to a system for estimating a stable running speed of a vehicle to control the driving speed of the vehicle so that the vehicle can stably pass over curves, etc. of roads.

BACKGROUND OF THE INVENTION

For reducing an operation load imposed on a driver, a vehicle speed control system is known. This system carries out a constant speed driving control operation under which a driver can drive a vehicle with keeping a vehicle speed set by the driver under such a condition that the vehicle speed must be kept to a constant speed, for example, when the vehicle runs on an express highway or the like. The constant speed driving control operation means a control operation for driving a vehicle with keeping a set vehicle speed by controlling an acceleration device for accelerating the vehicle and a deceleration device for decelerating the vehicle.

Various kinds of control systems have been proposed to perform the vehicle driving based on the vehicle speed control with higher safety. For example, there is known a control system for controlling (i.e., reducing) the vehicle speed so that the vehicle can pass over a curve under a stable condition when the vehicle runs at the curve (JP-A-2002-96654).

However, if the vehicle speed control described above is actually carried out, the vehicle might be decelerated to a vehicle speed at which it can stably pass over a curve before the vehicle reaches the curve (i.e., in front of the entrance of the curve).

When a vehicle approaches a curve, a driver controls the vehicle speed as follows. That is, the driver brakes the vehicle to decelerate the vehicle while immediately estimating a vehicle speed, a vehicle running locus, etc. under which the vehicle can safely run at the curve in consideration of achievable information on the shape of the curve, the current speed of the vehicle, the load surface condition, the surrounding conditions of the vehicle and the curve, the performance of the vehicle, etc., and estimating required deceleration by the time when the vehicle goes into the curve.

When the vehicle approaches the curve, the driver continues to drive the vehicle by properly adjusting the deceleration degree through braking operation or the like while estimating a vehicle speed at which the vehicle can stably run at the curve peak corresponding to the tightest position of the curve and estimating required deceleration by the time when the vehicle reaches the curve peak. When the vehicle has passed over the curve peak, the driver waits for arrival of the vehicle at the exit of the curve while keeping the vehicle speed, and then accelerates the vehicle until the vehicle speed reaches a legal speed for the road or a speed at which the driver believes that the vehicle runs safely on the next straight load.

As described above, in some cases, the vehicle speed control carried out by the conventional vehicle speed control system is different from the vehicle speed control carried out by general drivers. Thus, the drivers have a sense of incongruity. Furthermore, when a vehicle runs behind another vehicle, the following vehicle may excessively approach to the preceding vehicle if the preceding vehicle is decelerated to the vehicle speed at which the preceding vehicle can safely pass over a curve before the preceding vehicle reaches the curve.

Furthermore, various other kinds of control systems have been also proposed to perform the vehicle driving based on the vehicle speed control with higher safety. For example, there is known a control system in which the radius of curvature of a curve is calculated on the basis of plural nodes of a map data base and a permissible speed of approach to the curve is set on the basis of the radius of curvature thus calculated to perform the vehicle speed control (U.S. Pat. No. 6,138,084).

However, it has been found that the radius of curvature of a curve calculated in the manner as descried above is frequently deviated from the arcuate shape of the actual curve. That is, there are some curves which are not designed in a uniformly arcuate shape like it is drawn by compasses, but designed in an arc-composite shape like it is achieved by combining some arcuate shapes different in radius of curvature. Therefore, as described above, when the radius of curvature is calculated on the basis of the nodes of the map data base, the arc drawn on the basis of the radius of curvature thus calculated is not necessarily coincident with the shape of the actual curve. This is more remarkable as the shape of the curve is more complicated.

Furthermore, all the nodes of the map data base which serve as standard points for the calculation of the radius of curvature do not necessarily indicate the center (center points) of the road. They are located with some dispersion in the width direction of the road. This causes the difference between the arc drawn on the basis of the calculated radius of curvature and the shape of the actual curve. Therefore, the conventional vehicle speed control system for setting the permissible approach speed to the curve on the basis of the calculated radius of curvature carries out the vehicle speed control on the basis of the radius of curvature which is deviated from the shape of the actual curve.

A general driver immediately estimates a vehicle speed, a vehicle running locus, etc. under which the vehicle can safely run at the curve in consideration of achievable information on the shape of the actual curve, the current speed of the vehicle, the load surface condition, the surrounding conditions of the vehicle and the curve, the performance of the vehicle, etc., thereby controlling the vehicle. Accordingly, in some cases, vehicle speed control of the conventional vehicle speed control system for setting the permissible approach speed to the curve on the basis of the radius of curvature may be different from the vehicle speed control carried out by the general driver. Thus the driver has a sense of incongruity.

SUMMARY OF THE INVENTION

Therefore, the present invention has a first object to perform vehicle speed control without inducing any sense of incongruity to a driver.

In order to attain the first object, according to a system of the present invention, the position of a vehicle is detected, and the current speed of the vehicle is also detected. Subsequently, one or more nodes over which the vehicle is going to pass (pass target nodes) are detected on the basis of the position of the vehicle and map information. Furthermore, a stable running speed at which the vehicle stably runs when passing over each pass target node is calculated. With respect to the calculation of the stable running speed, a manner of storing stable running speeds which are calculated every node on a map in advance and then using the stable running speeds thus stored may be used in place of the manner of calculating the stable running speed of the vehicle every pass target node.

Thereafter, a deceleration at which the vehicle is decelerated from the current vehicle speed to the stable running speed at a pass target node by the time when the vehicle reaches the pass target node is calculated on the basis of the position of the vehicle, the pass target node, the stable running speed at the pass target node and the current speed of the vehicle. The maximum deceleration node for which the maximum deceleration is calculated is selected from the pass target nodes on the basis of the decelerations thus calculated, and the maximum deceleration node is set to a primary deceleration target point corresponding to a target point when first deceleration control after the selection of the maximum deceleration node is carried out.

Furthermore, a deceleration end node which is far away from the maximum deceleration node and at which the stable running speed is inverted from reduction to increase is selected from the pass target nodes. The deceleration end node is set to a secondary deceleration target point corresponding to a target point when second deceleration control after the selection of the maximum deceleration node is carried. The speed of the vehicle is controlled so that the speed is equal to the stable running speed at the maximum deceleration node by the time when the vehicle reaches the primary deceleration target point.

Furthermore, when the primary deceleration target point and the secondary deceleration target point are different from each other, the speed of the vehicle is controlled so that the speed is equal to the stable running speed at the deceleration end node by the time when the vehicle reaches the secondary deceleration target point. When the vehicle is controlled toward the primary deceleration target point or the secondary deceleration target point, the vehicle may be decelerated at a constant deceleration. The present invention is not limited to this deceleration mode, and the deceleration may be carried out stepwise.

Accordingly, as compared with the conventional control for setting only the entrance of a curve as a deceleration target, the vehicle speed control carried out by the vehicle speed control system of this invention is closer to the deceleration control which is carried out in conformity with the actual curve shape by a general driver, that is, the stepwise deceleration control which sets the entrance of the curve and the curve peak as deceleration targets as shown in FIG. 2. Furthermore, when the following vehicle runs behind the vehicle concerned, the following vehicle can easily predict the behavior of the vehicle concerned and thus the safety can be enhanced. Accordingly, the vehicle speed control can be performed without inducing any sense of incongruity to the driver.

After the vehicle passes over the secondary deceleration target point, the vehicle speed control may be carried out so that the vehicle speed is kept until the vehicle passes over the curve or so that the vehicle speed is kept for a while and then the vehicle is accelerated. In this case, as shown in FIG. 7, an acceleration starting point may be set to a point corresponding to an acceleration starting point after curve at which the vehicle speed is equal to a vehicle speed achieved by multiplying the stable running speed corresponding to a corrected acceleration target vehicle speed at the secondary deceleration target point by a coefficient (for example, a numeric value (for example, 1.2 larger than 1) or the like.

The present invention has a second object to calculate a stable vehicle driving speed in conformity with the actual shape of a road.

In order to attain the second object, according to a system of the present invention, the position of a vehicle itself is detected, and then one or more pass target nodes corresponding to nodes over which the vehicle is going to pass are detected on the basis of the position of the vehicle and map information. Here, when a preceding segment is defined as a segment which has as an end point a reference node corresponding to one of the pass target nodes and exists in front of the end point, a preceding-segment extension line segment is defined as a line segment achieved by extending the preceding segment in the direction to the far side with respect to the reference node, and a reference segment is defined as a segment which is located at the opposite side to the preceding segment with respect to the reference node, a reference node angle defined as the intersecting angle between the preceding-segment extension line segment. The reference segment is calculated on the basis of the map information.

Here, as shown in FIG. 13, the reference node angle is assumed as a turning angle (dθ) in the neighborhood of the reference node when the vehicle successively passes over the preceding segment ($L_{n-1}$) and the reference segment ($L_n$) in this order. However, the shapes of actual curves do not correspond to shapes achieved by linking segments, but shapes achieved by combining plural arcs. Accordingly, a vehicle passing over an actual curve does not linearly run on the front-side segment, turn at a reference angle (dθ) and then run on the reference segment, but runs along the shape of the curve as if it draws a running locus having a substantially arcuate shape. Therefore, the reference node angle at the reference node is corrected on the basis of the length of the preceding segment and the length of the reference segment which are based on the map information.

Specifically, the reference node angle (dθ) is corrected as follows. That is, the length ($L_n$) of the reference segment is divided by the sum of the length ($L_{n-1}$) of the preceding segment and the length ($L_n$) of the reference segment. Then the division result ($L_n/(L_{n-1}+L_n)$) is multiplied by the reference node angle value (dθ) to achieve the corrected reference node angle [$\{L_n/(L_{n-1}+L_n)\} \times d\theta$]. Considering a line segment Fn intersecting to the reference segment at the corrected reference node angle ($d\theta_1$) at the reference node, a portion located in the neighborhood of the reference node on the line segment Fn represents the locus of the vehicle when the vehicle running along the shape of the actual road passes over the reference node.

In FIG. 13, when a point A represents one of both the end points of the reference segment which is located at the farther side from the reference node and a point B represents one of both the end points of the reference segment which is located at the farther side from the reference node when the reference segment is rotated toward the preceding-segment extension line segment around the reference node by the corrected reference node angle, the inter-point distance (S) between the points A and B is calculated on the basis of the map information. The stable running speed ($V_r$) at which the vehicle can run stably when it passes over the reference node is calculated on the basis of the corrected reference node angle ($d\theta_1$) and the inter-point distance (S).

As described above, a stable running speed calculating system for a vehicle according to the present invention corrects the reference node angle so that the locus drawn on the basis of the preceding segment and the reference segment approaches a substantially arcuate locus along which the actual vehicle runs. The system further calculates the stable running speed on the basis of the corrected reference node angle. That is, as compared with the conventional calculation manner of calculating the stable running speed on the basis of the radius of curvature which is frequently deviated from the actual curve shape, the vehicle speed control system of the present invention can calculate the stable running speed in conformity with the actual curve shape.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Preferred embodiments according to the present invention will be described hereunder with reference to the accompanying drawings.

[First Embodiment]

Figure 1:
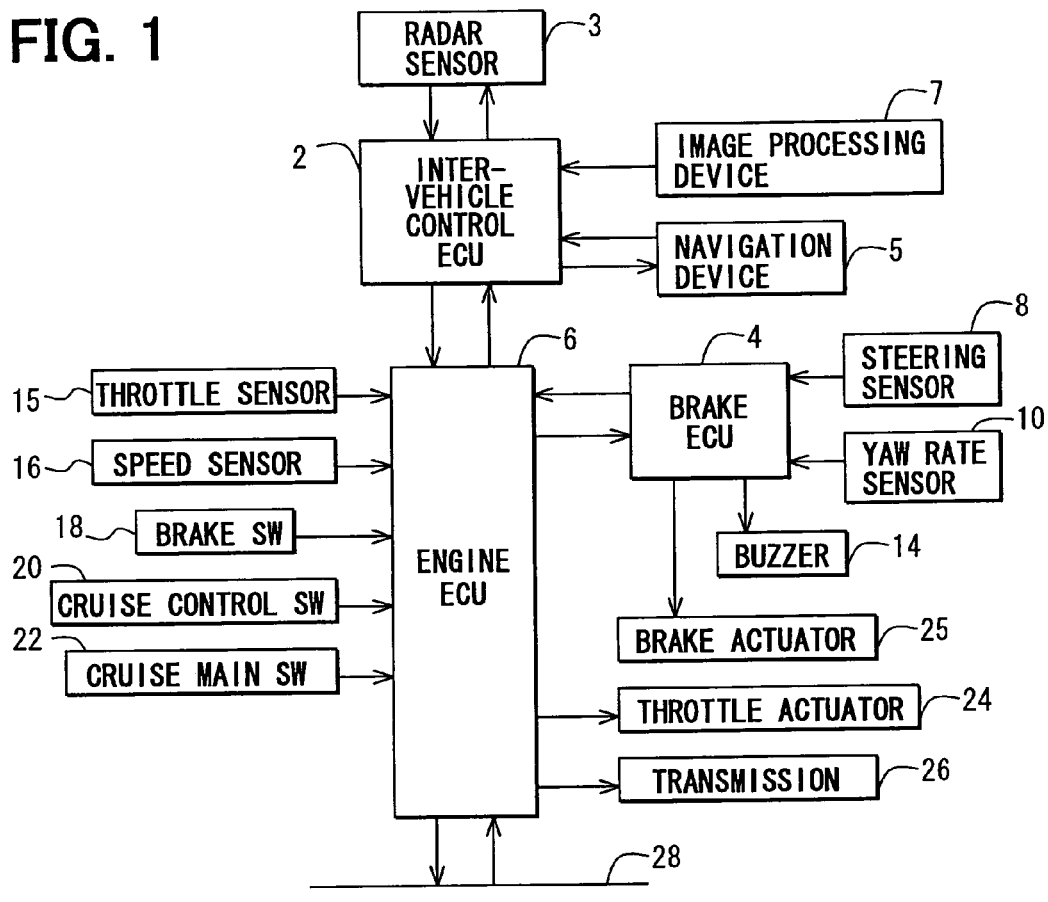
FIG. 1 is a block diagram showing a vehicle speed control system according to a first embodiment of the present invention.

Referring first to FIG. 1, a cruise control system is shown as a vehicle speed control system. The vehicle speed control system mainly comprises an electric control unit 2 for inter-vehicle control (inter-vehicle control ECU), an electric control unit 6 for engine control (engine ECU) 6 and a brake electric control unit 4 (brake ECU) 4.

The inter-vehicle control ECU 2 is an electronic circuit which mainly comprises a microcomputer, and receives a current vehicle speed (Vn) signal, a steering angle signal, a yaw rate signal, a target inter-vehicle time signal, wiper switch information, a control status signal for idle control, brake control, etc. from the engine ECU 6. The inter-vehicle control ECU 2 also receives travel route information from a navigation device 5 described later. Furthermore, the inter-vehicle control ECU 2 carries out estimation of the radius of curvature R for a curve, an inter-vehicle control operation, calculation of a stable running speed at which a vehicle stably runs at each node as described later, calculation of a deceleration at each node as described later, setting of a deceleration target point as described later, vehicle speed control, etc. on the basis of the data received. The inter-vehicle control ECU 2 thus attains stable running speed calculation, deceleration calculation, deceleration target point setting and various controls.

A laser radar sensor 3 is an electric circuit mainly comprising a laser-based scanning range finder and a microcomputer. It calculates the probability that each preceding object (object runs in front of the vehicle concerned) exists on the present lane of the vehicle concerned (the present lane probability of a preceding vehicle) as a part of the function of the inter-vehicle control system on the basis of the angle, relative speed, etc. of the preceding vehicle detected by the scanning range finder and the current vehicle speed (Vn) signal, the radius of curvature R for the curve, etc. received from the inter-vehicle control ECU 2. It transmits the calculation result as preceding vehicle information containing the information on the relative speed, etc. to the inter-vehicle control ECU 2. A diagnosis signal of the laser radar sensor 3 itself is also transmitted to the inter-vehicle control ECU 2.

The scanning range finder functions to irradiate a transmission wave or laser beam in a predetermined angular range in the vehicle width direction while scanning the transmission wave or laser beam, and detects the distance between the vehicle itself and a preceding object (object in front of the vehicle concerned) on the basis of reflection wave or reflection light from the object in accordance with the scan angle.

Furthermore, the inter-vehicle control ECU 2 determines a preceding vehicle to be subjected to the inter-vehicle control on the basis of the lane probability, etc. contained in the preceding vehicle information received from the laser radar sensor 3, and transmits a target acceleration/deceleration signal, a fuel cut request signal, an over-drive (OD) cut request signal, a 3-speed shift down request signal and a brake request signal as control instruction values to properly adjust the following distance (the distance from the preceding vehicle) to the engine ECU 6. Furthermore, it determines whether an alarm should be generated or not, and then transmits an alarm sound request signal or an alarm sound stop request signal. It also transmits a diagnosis signal, a display data signal, etc.

The navigation device 5 mainly comprises a navigation ECU, a GPS (Global Positioning System) sensor as position detecting means, DVD-ROM as map information storing means in which a map data base is recorded, etc. It calculates the position of the vehicle, and outputs information on a travel route (along which the vehicle concerned runs) to the inter-vehicle control ECU 2 at a fixed interval (about every 1 second).

Here, the information on the travel route contains link information, node information, segment information, inter-link connection information, etc., and these information pieces are stored in the road data base described above.

The link information contains "link ID" which is an inherent number to specify a link, "link class" for identifying an express highway, a toll road, an open way, an access road or the like, and information on a link itself such as "starting point coordinate" and "terminal point coordinate" of the link, "link length" representing the length of the link, etc.

The node information contains "node ID" which is a number inherent to a node establishing a link, and information on node latitude, node longitude, right/left-turn prohibition at cross point, presence or absence of traffic signal, etc. The segment information contains a segment ID, a start point (node) latitude (degree), a start point (node) longitude (degree), the direction of a segment (dir), the length of a segment (inter-node distance, len), etc. The values of the start point latitude and longitude contain values after decimal point and are achieved by converting "minute", "second" to "degree". The direction (dir) of the segment turns counterclockwise with the east direction on the map as a reference direction (dir=0), and one unit (dir=1) is set to a value achieved by dividing one turn of 360 degrees into 1024 angular parts. For example, "dir=30" represents a direction achieved by turning the east direction on the map counterclockwise by (30×360/1024) degrees. With respect to the length of the segment (inter-node distance, len), one unit (len=1) is set to actual 10 cm.

Data indicating whether passage is possible or not because of one-way traffic or the like is set in the inter-link connection information. Even in the case of the same links, there may occur such a case that passage from some link is possible, but passage from another link is impossible because of one-way traffic. Accordingly, passage-possibility or passage-impossibility is determined in accordance with the connection mode between links. Thus, the navigation device 5 operates to detect the pass target node.

The brake ECU 4 is an electrical circuit mainly comprising a microcomputer. The brake ECU 4 determines a steering angle and a yaw rate on the basis of signals output from a steering angle sensor 8 for detecting the steering angle of the vehicle and a yaw rate sensor 10 for detecting the yaw rate, and transmits these data to the inter-vehicle control ECU 2 through the engine ECU 6. Furthermore, the brake ECU 4 controls a brake actuator 25 for conducting duty-control on the opening/closing operation of a pressure-increasing control valve and pressure-reducing control valve which are equipped in a brake hydraulic circuit to control braking force. The brake ECU 4 makes an alarm buzzer 14 sound in response to an alarm request signal from the inter-vehicle control ECU2 through the engine ECU 6. The brake ECU 4 operates to decelerate the vehicle.

The engine ECU 6 is an electrical circuit mainly comprising a microcomputer, and receives detection signals from a throttle opening degree sensor 15, a vehicle speed sensor 16 for detecting the vehicle speed, a brake switch 18 for detecting whether the driver puts on the brake or not, a vehicle speed control switch 20, a cruise main switch 22, other kinds of sensors and a switch group, and wiper switch information, tail switch information, etc. received through a well-known communication line such as a body LAN 28 or the like. Furthermore, it receives the steering angle signal and the yaw rate signal from the brake ECU 4 and the target acceleration signal, the fuel cut request signal, the OD cut request signal, 3-speed shift down request signal, the alarm request signal, the diagnosis signal, the display data signal, etc. from the inter-vehicle control ECU 2.

Here, the vehicle speed control switch 20 is equipped with a control start switch, a control end switch, an access switch, a coast switch, etc. The control start switch is for setting a vehicle speed control allowable state under which the vehicle speed control can be started. The vehicle speed control allowable state is set by setting the control start switch to ON under the state that the main switch is set to ON. Under the vehicle speed control, the inter-vehicle control and the constant speed driving control are selectively carried out under a predetermined condition. The access switch is for gradually increasing the set vehicle speed stored by pressing the access switch. The coast switch for gradually reducing the set vehicle speed stored by pressing the coast switch. Furthermore, the inter-vehicle distance between the vehicle concerned and the preceding vehicle can be set through the vehicle speed control switch 20. The inter-vehicle distance can be stepwise set in conformity with a driver's preference.

The engine ECU 6 outputs a driving instruction to a throttle actuator 24 for adjusting the throttle opening degree of the internal combustion engine (in this case, gasoline engine) and to the actuator driving device of a transmission 26 in accordance with a driving status which is determined on the basis of the signal received. By these actuators, the output of the internal combustion engine, the braking force or the transmission shift can be controlled. In this case, the transmission 26 is a 5-speed automatic transmission, and it is designed in a 4-speed+overdrive (OD) structure in which the reduction gear ratio of 4-speed is set to "1" and the reduction gear ratio of 5-speed is set to a value (for example, 0.7) smaller than that of 4-speed. Accordingly, when the OD cut request signal is output, the transmission 26 would be shifted down to 4-speed if the transmission 26 is set to 5-speed (that is, the shift position of the over-drive). Furthermore, when the shift-down request signal is output, the transmission 26 would be shifted down to 3-speed if the transmission 26 is set to 4-speed. As a result, through the shift-down operation, large engine brake occurs and the vehicle concerned is decelerated by the engine brake.

The engine ECU 6 transmits and displays necessary display information through the body LAN 28 on a display device such as LCD or the like equipped to a meter cluster, or transmits the current vehicle speed (Vn) signal, the steering angle signal, the yaw rate signal, the target inter-vehicle time signal, the wiper switch information signal, and the control status signals of the idle control and the brake control to the inter-vehicle control ECU 2.

Figure 3:
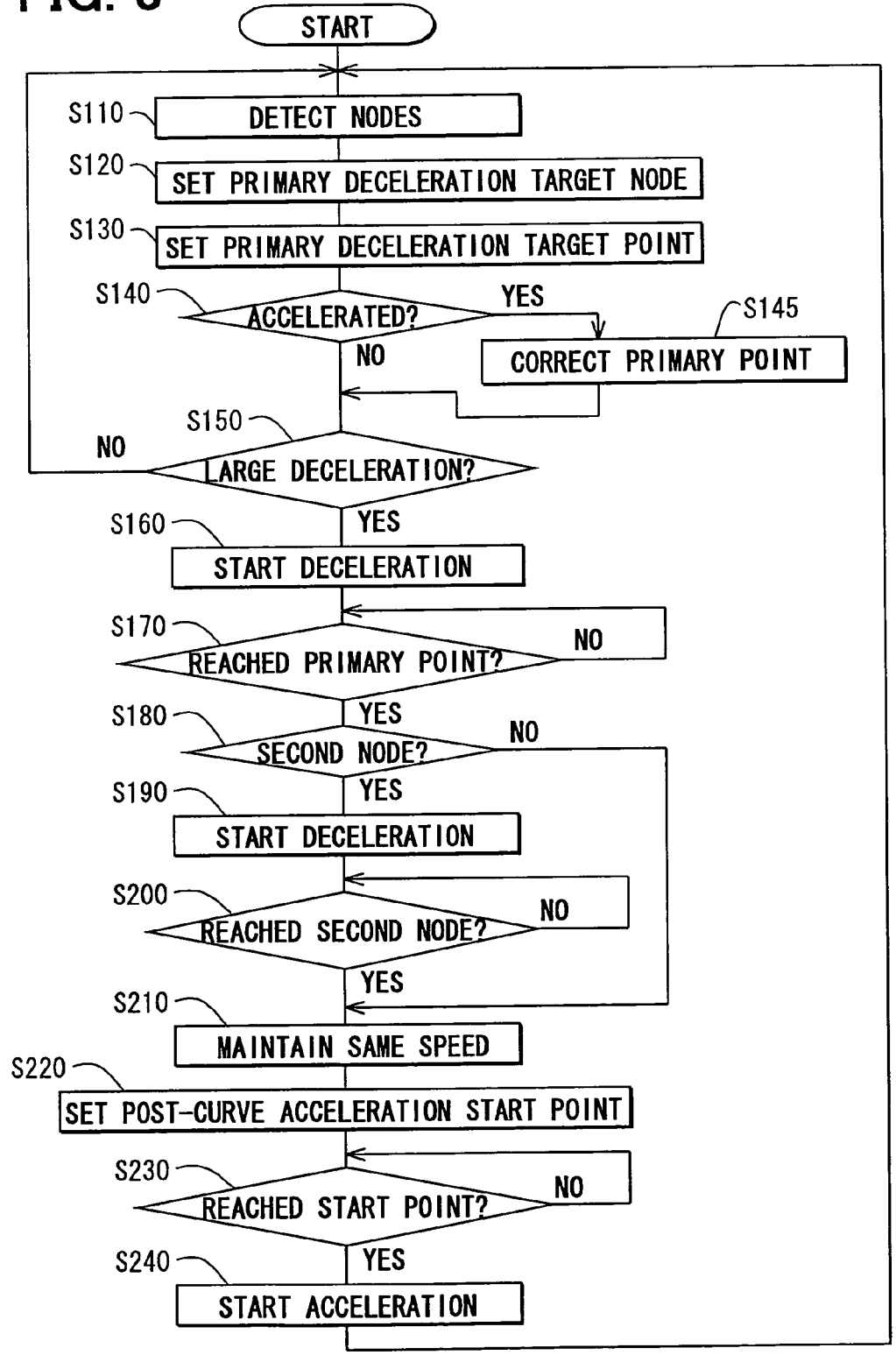
FIG. 3 is a flowchart showing the deceleration control executed by the vehicle speed control system according to the first embodiment.

Next, the deceleration control processing executed by the inter-vehicle control ECU 2 will be described with reference to the flowchart used for the deceleration control processing of FIG. 3 and diagrams 1 to 7 of FIGS. 4 to 10 showing the deceleration control. In FIGS. 4 to 10, the distance L from the current position of the vehicle is set on the abscissa axis, and the speed of the vehicle (represented by vehicle speed v in the figures) is set on the ordinate axis. The positions of the respective nodes, the stable running speeds Vr described later, etc. are plotted, and the points thus plotted are linked to one another, thereby representing a substantially curved line. In the figures, the points related to the deceleration control such as the primary deceleration target point, etc. described later are properly shown.

In the first step(S) 110, nodes in a predetermined range are detected. For this step, the navigation device 5 calculates the position of the vehicle, and the vehicle speed sensor 16 detects the current vehicle speed. Subsequently, the vehicle stop distance Lo (m) from the position to the point at which the vehicle is stopped when the vehicle is decelerated at a reference deceleration $\alpha_0$ is calculated by using the following equation (1).

$$L_0 = V_0^2/2\alpha_0 = V_0^2/(2 \times 0.784) \tag{1}$$

$V_0$: current speed of vehicle (m/s)

$\alpha_0$: reference deceleration (m/s$^2$)

Figure 4:
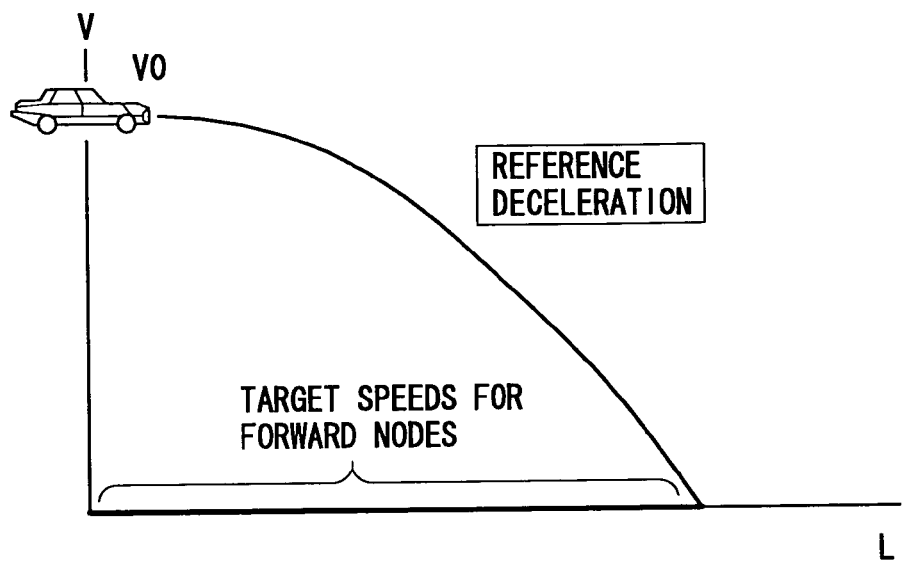
FIG. 4 is a first diagram showing the deceleration control executed by the vehicle speed control system according to the first embodiment.

Here, reference deceleration $\alpha_0$ means a deceleration level at which the driver and other passengers of a vehicle have no uncomfortable feeling when the vehicle is decelerated at the deceleration concerned. It may be predetermined experimentally or the like in advance. In this embodiment, the reference deceleration $\alpha_0$ is set to 0.08 G (=0.784 m/s$^2$). As shown in FIG. 4, on the basis of the map data base, the navigation device 5 detects nodes existing between the vehicle position and a point which is ahead of the vehicle position by the vehicles top distance $L_0$, that is, a point at which the vehicle would be stopped if the vehicle is decelerated at the reference deceleration $\alpha_0$ from the current vehicle position, and outputs the information on the nodes thus detected to the inter-vehicle control ECU 2.

Subsequently, a stable running speed $V_r$ at which the vehicle runs stably when it passes over each node, and a deceleration $\alpha_n$ needed to accelerate/decelerate the vehicle to the stable running speed at each node by the time when the vehicle reaches the node are calculated in this order.

Specifically, the angle d$\theta$ between a segment $l_{n-1}$ connecting a reference node (corresponding to one of the detected nodes) and a node (preceding node) located at a preceding side of the reference node and a segment $l_n$ connecting the reference node and a node (subsequent node) located at a subsequent side of the reference node is calculated by using the following equation (2) or (2').

$$d\theta = (dir_n - dir_{n-1}) \times 360/1024 \tag{2}$$

$$d\theta = \{1024 - (dir_n - dir_{n-1})\} \times 360/1024 \tag{2'}$$

d$\theta$: the angle between the segment $l_{n-1}$ and the segment $l_n$ $dir_n$: the direction of the segment $l_n$ $dir_{n-1}$: the direction of the segment $l_{n-1}$ In this case, it is assumed that the equation (2) is used when the absolute value of ($dir_n - dir_{n-1}$) is less than a numeric value (512), and the equation (2') is used when the absolute value of ($dir_n - dir_{n-1}$) is not less than the numeric value (512). When the value of ($dir_n - dir_{n-1}$) is a negative value, the absolute value of the negative value is used for the calculation.

Subsequently, the angle d$\theta$ is corrected by using the following equation (3) for the following reason. That is, this is because the vehicle running at the curve does not run straightly at the portion corresponding to a segment on a road and turn at the angle d$\theta$ at each node, but it runs at the outside of the portions corresponding to the segment on the road while passing over the neighboring of each node as if it draws an arc. $l_n$ and $l_{n-1}$ represent the length of the segment $l_n$ and the length of $l_{n-1}$, respectively. In this case, the length of each segment on the map data base is represented by using "len", and thus a value calculated by using the calculation equation len×0.1 (mm) is used.

$$d\theta_1 = (l_n/(l_{n-1} + l_n)) \times d\theta \tag{3}$$

$d\theta_1$: the corrected angle achieved by correcting the angle d$\theta$ between the segment $l_{n-1}$ and $l_n$. Furthermore, when the vehicle passing over the segment $l_{n-1}$ runs straightly at the angle d$\theta_1$ at the reference node, a lateral movement distance S (m) needed for the vehicle to arrive at the next node position is calculated by the following equation (4).

$$S = l_n \times \sin d\theta_1 \tag{4}$$

Furthermore, the stable running speed Vr (m/s) at which the vehicle stably runs when it passes over each node is calculated every node by using the following equation (5).

$$V_r = l_m \times (N/2S)^{1/2} \tag{5}$$

N: default (m/s$^2$)

The default N is set to 0.3 G (=2.94 m/s$^2$) in this embodiment.

Still furthermore, the deceleration $\alpha_n$ (m/s$^2$) needed to accelerate/decelerate the vehicle so that the vehicle speed is equal to the stable running speed at each node by the time when the vehicle reaches the node is calculated every node by using the following equation (6).

$$\alpha_n = (V_o^2 - V_r^2)/2L_r \tag{6}$$

Figure 5:
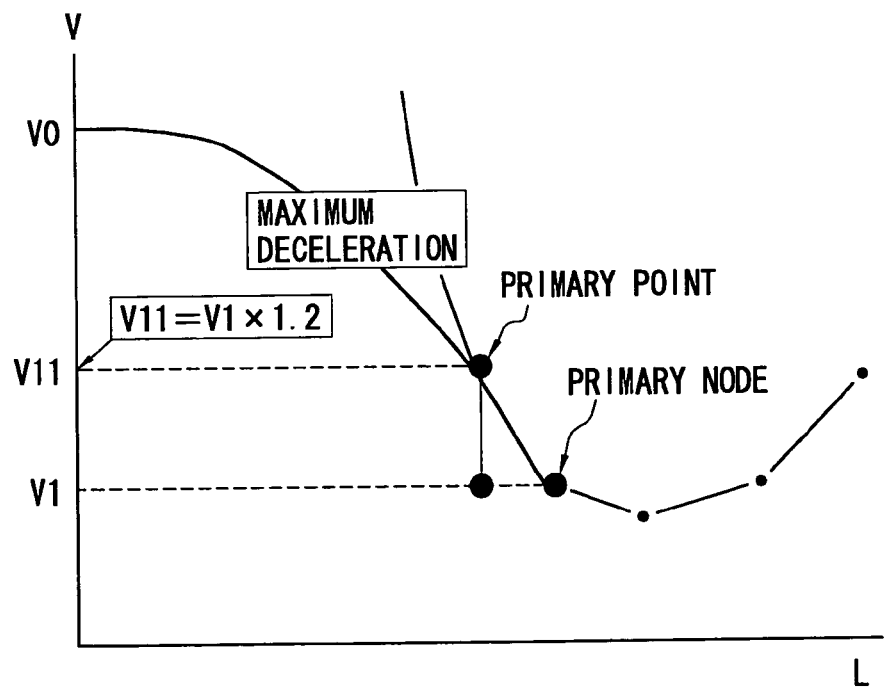
FIG. 5 is a second diagram showing the deceleration control executed by the vehicle speed control system according to the first embodiment.
Figure 6:
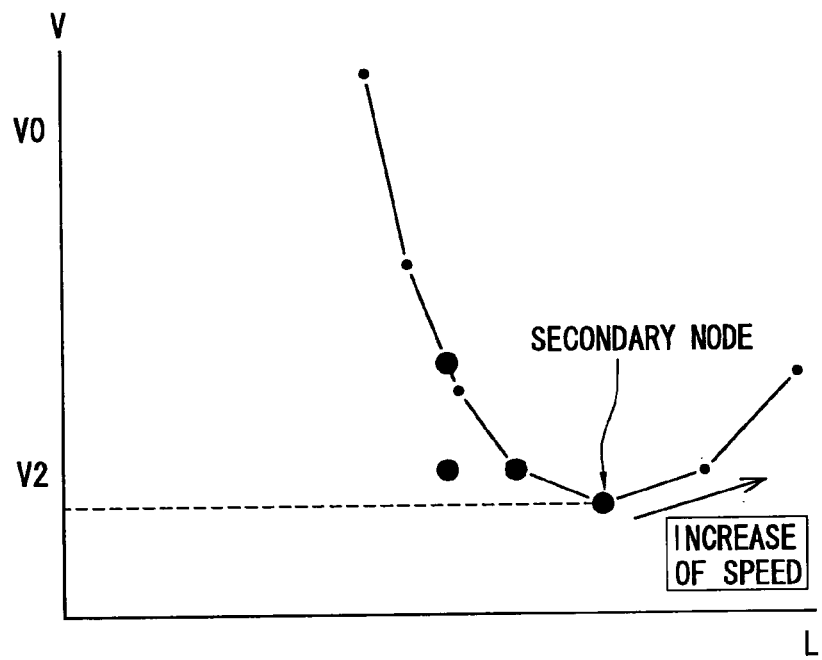
FIG. 6 is a third diagram showing the deceleration control executed by the vehicle speed control system according to the first embodiment.

$L_r$: the distance (m) between the current position of the vehicle and the node In the subsequent S120, the node at which the deceleration value is maximum is selected on the basis of the deceleration $\alpha_n$ of each node calculated at S110 as shown in FIG. 5. The node thus selected is set to a primary deceleration target node and also the stable running speed at the primary deceleration target node is set to a primary deceleration target vehicle speed $V_1$. When plural candidates exist as the primary deceleration target node, a node nearest to the vehicle is set as the primary deceleration target node. The primary deceleration target node corresponds to the maximum deceleration node.

At S130, a primary deceleration target point is set. The primary deceleration target point is a target point for a first deceleration control operation after the node at which the deceleration value is maximum is selected at S120. Specifically, as shown in FIG. 5, the value achieved by multiplying the primary deceleration target vehicle speed $V_1$ by deceleration target speed ratio (in this embodiment, the numeric value of 1.2) is set as a corrected primary deceleration target vehicle speed $V_{11}$. A point on a substantially curved line achieved by linking the nodes at which the corrected primary deceleration target vehicle speed $V_{11}$ is achieved is set as a primary deceleration target point. This is because the nodes on the map information are set so as to be spaced from one another. Thus the actual point at which the deceleration is maximum is not necessarily coincident with the position on the road which corresponds to the primary deceleration target node.

At subsequent S140, it is determined whether the vehicle is being accelerated or not. If the vehicle is being accelerated (S140: YES), the distance Ls(m) by which the vehicle has moved until the acceleration is reduced to zero is calculated by the following equation (7).

$$Ls = \alpha V of / d\alpha \quad (7)$$

α: current acceleration of vehicle (m/s²)
dα: maximum acceleration variation rate (m/s³)

The maximum acceleration variation rate dα is set so that the acceleration of the vehicle is not rapidly varied, and it is set to 1.0 m/s³ in this embodiment.

Figure 9:
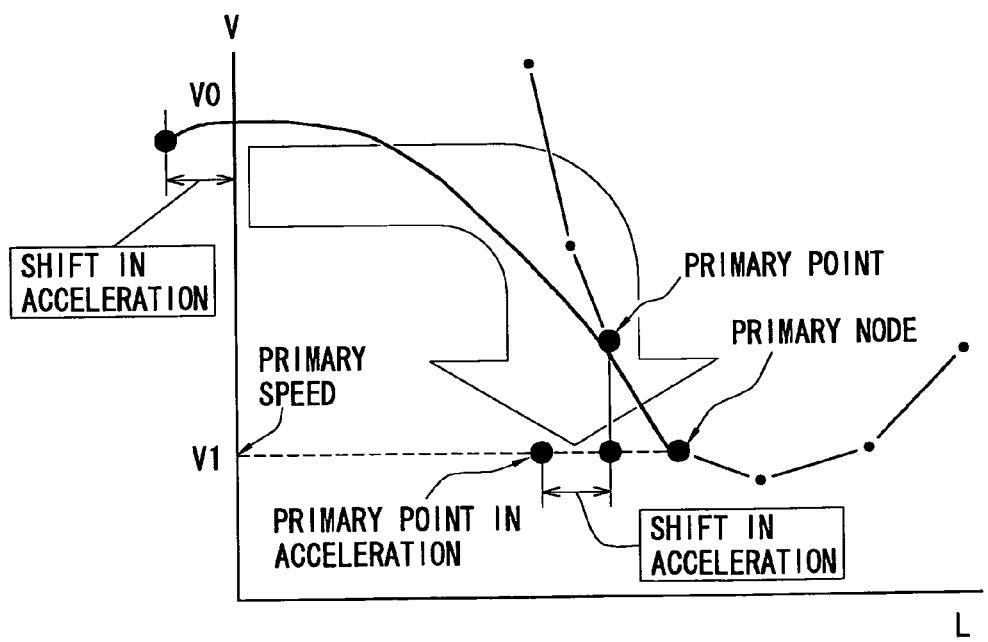
FIG. 9 is a sixth diagram showing the deceleration control executed by the vehicle speed control system according to the first embodiment.

As shown in FIG. 9, the correction processing of shifting the primary deceleration point to the preceding side by only the movement distance $L_s$ (corresponding to under-acceleration deceleration target shift amount in FIG. 9) is carried out (S145), and then the processing proceeds to S150. On the other hand, if the vehicle is not being accelerated (S140: No), the processing is directly shifted to S150.

At S150, it is determined whether the deceleration value at the primary deceleration target node is large, that is, not less than the reference deceleration. If the deceleration value at the primary deceleration target node is less than the reference deceleration (S150: NO), the vehicle speed control processing is stopped and the processing returns to S110. On the other hand, if the deceleration value at the primary deceleration target node is not less than the reference deceleration (S150: YES), it is determined that the vehicle must be decelerated because a curve exists ahead of the vehicle or the like, and the processing proceeds to S160.

Figure 8:
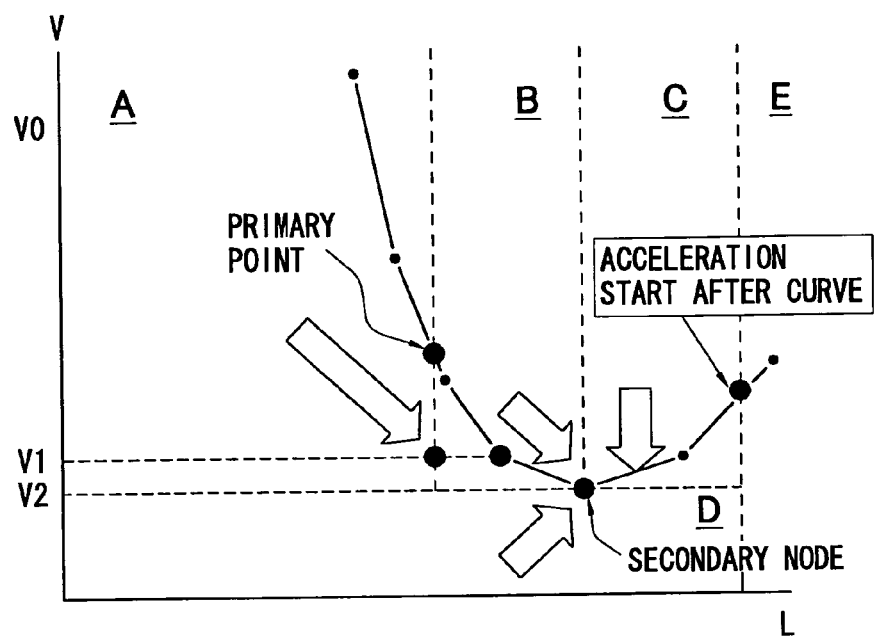
FIG. 8 is a fifth diagram showing the deceleration control executed by the vehicle speed control system according to the first embodiment.

At S160, the deceleration is calculated so that the vehicle speed is reduced to the corrected primary deceleration target vehicle speed $V_{11}$ by the time when the vehicle reaches the primary deceleration target point, and the deceleration is started as shown as an area A in FIG. 8.

The vehicle is decelerated so that the vehicle speed becomes equal to the corrected primary deceleration target vehicle speed $V_{11}$. It is determined at S170 whether the vehicle reached the primary deceleration target point. If the vehicle reached the primary deceleration target point (S170: YES), the processing is shifted to S180.

Figure 7:
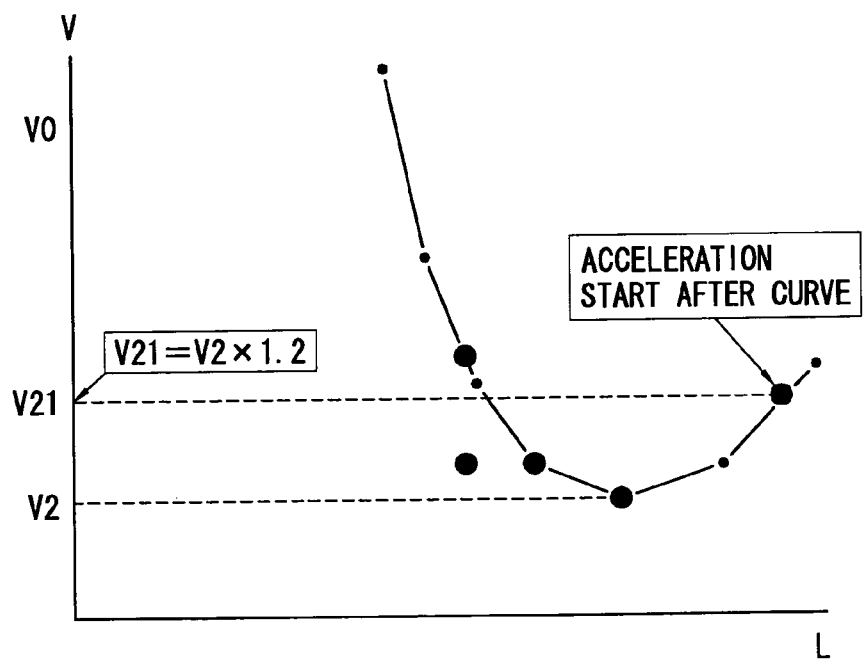
FIG. 7 is a fourth diagram showing the deceleration control executed by the vehicle speed control system according to the first embodiment.

At S180, as shown in FIG. 7, a node at which the decelerating operation is finished and changed to the accelerating operation is selected on the basis of the acceleration/deceleration of each node calculated in the preceding S120. If the node thus selected is the same as the primary deceleration target node (S180:NO), the node concerned is set as the secondary deceleration target node. Then the processing is directly shifted to S210 to maintain the same vehicle speed (S210).

On the other hand, if the node is different from the primary deceleration target node (S180: YES), the node concerned is set as the secondary deceleration target node. The stable running speed at the secondary deceleration target node is set as the secondary deceleration target vehicle speed $V_2$ and then the processing is shifted to S190. This secondary deceleration target node is set as a target point when the second deceleration control is carried out after it is determined that the deceleration at the primary deceleration target node is not less than the reference deceleration. The secondary deceleration target node corresponds to the deceleration end node and the secondary deceleration target point.

At S190, the deceleration is started toward the secondary deceleration target node set in the preceding S180 (area B in FIG. 8), and the processing is shifted to S200.

In S200, the vehicle is decelerated so that the vehicle speed is equal to the secondary deceleration target vehicle speed $V_2$ by the time when the vehicle arrives at the secondary deceleration target node (S200:NO). If the vehicle reaches the secondary deceleration target node (S200:YES), then the vehicle speed is maintained (S210).

At subsequent S220, a point at which the acceleration is started after the vehicle passes over the curve (post-curve acceleration starting point) is set. Specifically, the value achieved by multiplying the secondary deceleration target vehicle speed $V_2$ by the acceleration target speed ratio (the numerical value of 1.2 in this embodiment) is set as a corrected acceleration target vehicle speed $V_{21}$ as shown in FIG. 7. A point on a substantially curved line linking nodes at which the vehicle speed is equal to the corrected acceleration target vehicle speed $V_{21}$ is set as the post-curve acceleration starting point.

Figure 2:
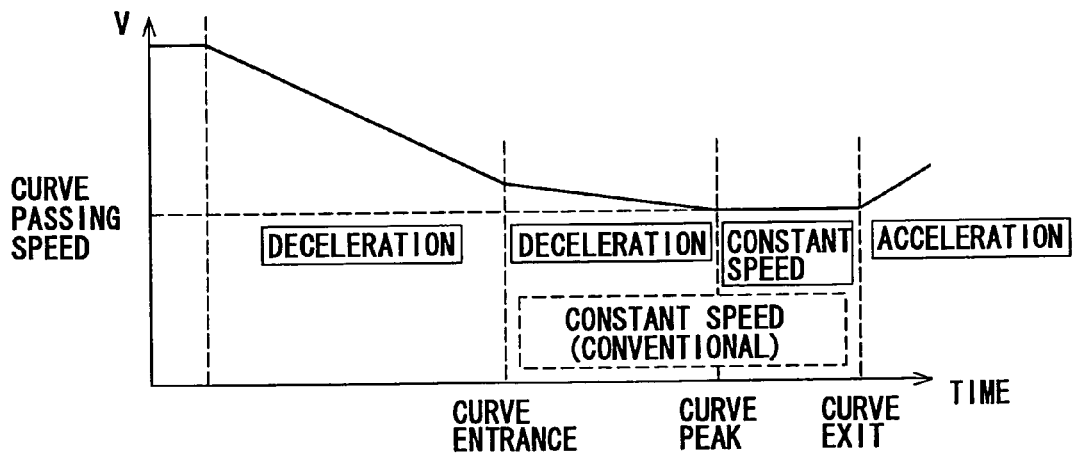
FIG. 2 is a time chart showing deceleration control executed by the vehicle speed control system of the first embodiment.

The vehicle speed is maintained until the vehicle arrives at the post-curve acceleration starting point (S230:NO, constant speed running in FIG. 2). If the vehicle arrives at the post-curve acceleration starting point (S230:YES), the deceleration control is finished, and the vehicle is accelerated (S240, area in FIG. 8).

As described above, the vehicle speed control system of this embodiment sets the primary deceleration target point and the secondary deceleration target node as described above to perform stepwise deceleration control by setting the entrance of a curve and the curve peak as deceleration targets every time the deceleration control is required, for example, when the vehicle approaches a curve or the like.

As shown by the area A of FIG. 8, before the vehicle passes over the primary deceleration target point, the vehicle speed may be decelerated more excessively than required because of an effect of a preceding vehicle or traffic jam. In such a case, the deceleration control is stopped, and the acceleration control is carried out according to the situation. Specifically, the running distance when the vehicle runs while accelerated at a permissible acceleration for a deceleration releasing coefficient time (hereinafter merely referred to as "running distance") Lu(m) is calculated by using the following equation (8).

$$L_u = V_o k + \alpha_u k^2 / 2 \quad (8)$$

$\alpha_u$: permissible acceleration (m/s²)
k: deceleration releasing coefficient time (s)

Here, the permissible acceleration $\alpha_u$ means an acceleration level at which the driver and other passengers of the vehicle have no uncomfortable feeling, and it is set to 0.08 G (=0.784 m/s²) in this embodiment. The deceleration releasing coefficient time k means the minimum acceleration time for which the driver and other passengers of the vehicle have no uncomfortable feeling, and it is set to 1.0 s in this embodiment.

Figure 10:
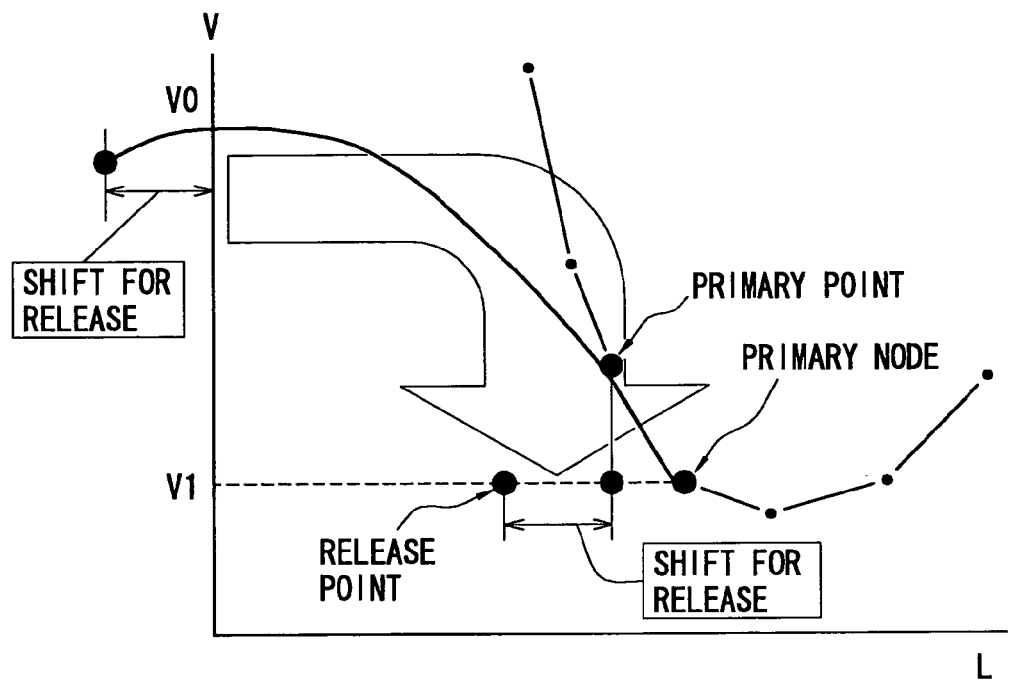
FIG. 10 is a seventh diagram showing the deceleration control executed by the vehicle speed control system according to the first embodiment.

As shown in FIG. 10, the primary deceleration point is shifted toward the preceding side by the running distance $L_u$ (corresponding to the deceleration releasing target shift amount in FIG. 9), and the position thus shifted is set as the deceleration releasing target point. If the deceleration at the deceleration releasing target point is not more than the reference deceleration, the deceleration control is stopped, and the acceleration control is carried out, which makes the driver have no sense of incongruity. When the vehicle speed is decelerated more excessively than required and thus it is lower than the secondary deceleration target vehicle speed, the deceleration control is released and the vehicle speed is controlled so as to be equal to the "secondary deceleration target vehicle speed $V_2$).

As described above, according to the vehicle speed control system of this embodiment, respective nodes existing ahead of the vehicle are detected, and the stable running speed $V_T$ at which the vehicle stably runs when it passes over each node and the deceleration $\alpha_n$ needed to decelerate the vehicle so that the vehicle speed is equal to the stable running speed at each node by the time when the vehicle arrives at the node are successively calculated (S110). The point at which the deceleration value is maximum is selected on the basis of the deceleration $\alpha_n$ of each node, and the deceleration control is carried out on the vehicle so that the vehicle speed is equal to the stable running speed at the point by the time when the vehicle arrives at the point (S140 to S170). Furthermore, when a point at which the curving degree is maximum (i.e., curve peak point) is different from the above point at which the deceleration value is maximum and the curve peak point concerned exists ahead of the vehicle (S180: YES(presence)), further necessary deceleration control is carried out (S190, S200). That is, the vehicle speed control based on the vehicle speed control system of this embodiment approaches the stepwise deceleration control which is carried out at curves by drivers. Furthermore, when there is a following car, the following car can easily predict the behavior of the vehicle concerned (preceding vehicle), and the safety can be enhanced. Accordingly, the vehicle control can be performed without inducing any sense of incongruity to drivers.

The first embodiment described above may be modified as follows.

(1) In the vehicle speed control system of the first embodiment, the primary deceleration target point and the secondary deceleration target point are set on the basis of the node information detected from the map data base by the navigation device 5. However, the deceleration target points may be set on the basis of reception information from the laser radar sensor 3 or the image information received from the image processing device.

(2) In the vehicle speed control system of the first embodiment, the inter-vehicle control ECU 2 calculates the stable running speed $V_T$ every node. However, this mode may be modified so that the navigation device 5 stores the table running speed $V_T$ in the map data base in connection with the node information in advance and transmits the stable running speed $V_T$ to the inter-vehicle ECU 2 along with the node information. Furthermore, the navigation device 5 may calculate the stable running speed $V_T$. In this case, it is unnecessary for the inter-vehicle control ECU 2 to calculate the stable running speed $V_T$ every time. Thus the load imposed on the inter-vehicle control ECU 2 can be reduced.

Furthermore, the running speed $V_T$ of the vehicle while the vehicle runs may be stored together with the node information corresponding to the running speed $V_T$ by the navigation device 5. In this case, when the vehicle runs on a road on which the vehicle runs previously, the inter-vehicle control ECU 2 can read out from the navigation device 5 the running speed $V_T$ when the vehicle run previously, and use the running speed $V_T$, so that the vehicle can run at the same speed as ever.

(3) In the deceleration processing of the first embodiment, the inter-vehicle control ECU 2 controls to decelerate the vehicle at a constant deceleration until the vehicle arrives at the primary deceleration target point or the secondary deceleration target node. However, the vehicle may be stepwise decelerated.

(4) In the deceleration processing of the first embodiment, the navigation device 5 detects the nodes existing between the current position of the vehicle and the point at which the vehicle is stopped when the vehicle is decelerated at the reference deceleration $\alpha_o$, and calculates the stable running speed $V_T$ for these nodes. However, nodes existing within a predetermined distance range (for example, within 500 m) from the position of the vehicle may be detected from the map data base. In this case, the number of the steps required for the processing can be reduced as compared with the processing of the first embodiment. Thus the load of the navigation device 5 can be reduced.

(5) In the deceleration control processing of the first embodiment, the secondary deceleration target node may be reset as the secondary deceleration target point at the preceding side. Specifically, as in the case where the primary deceleration target point is reset at S140, the secondary deceleration target vehicle speed $V_2$ is multiplied by the deceleration target speed ratio, and a point on the substantially curved line linking the nodes at which the multiplication result is achieved is reset to the secondary deceleration target point. This mode can enhance the probability that the vehicle is sufficiently decelerated by the time when the vehicle arrives as a point at which the deceleration is actually finished.

(6) The first embodiment may be modified so that the driver can alter the stable running speed values $V_T$ at the primary deceleration target point, the secondary deceleration target point and the post-curve acceleration starting point set by the inter-vehicle control ECU 2. Specifically, it may be considered that the stable running speed $V_T$ at each point is multiplied by a coefficient, and the multiplication result is reset as the stable running speed $V_T$. In this case, with respect to the coefficient value, when the vehicle speed is required to be increased as a whole, the coefficient value may be set to a numeric value (for example, 1.2) larger than 1.0. On the other hand, when the vehicle speed is required to be reduced as a whole, the coefficient value may be set to a numeric value (for example, 0.8) less than 1.0. In this case, the driver can correct the vehicle speed control to his/her favorable vehicle speed control, so that the vehicle speed control can be performed in conformity with the driver's preference (i.e., no sense of incongruity). In this case, the driver may input his/her favorable numerical value as the coefficient.

Furthermore, the first embodiment may be modified so that the manufacture side prepares for various choices for the coefficient (for example, the numeric values of 0.8, 1.0, 2.0, etc.) which are set so as to reflect the driver's preference, and the driver selects one of the choices. Still furthermore, it is preferable that in place of presentation of the numeric values of the coefficient, names such as soft mode, normal mode, sport mode, etc. are allocated to the numeric values in numerically-increasing order to enable the driver easily understand the coefficient. The choices may be preset when the vehicle speed control system of this embodiment is manufactured, or the driver may set the choices if the setting of the choices can be changed afterwards.

[Second Embodiment]

Figure 11:
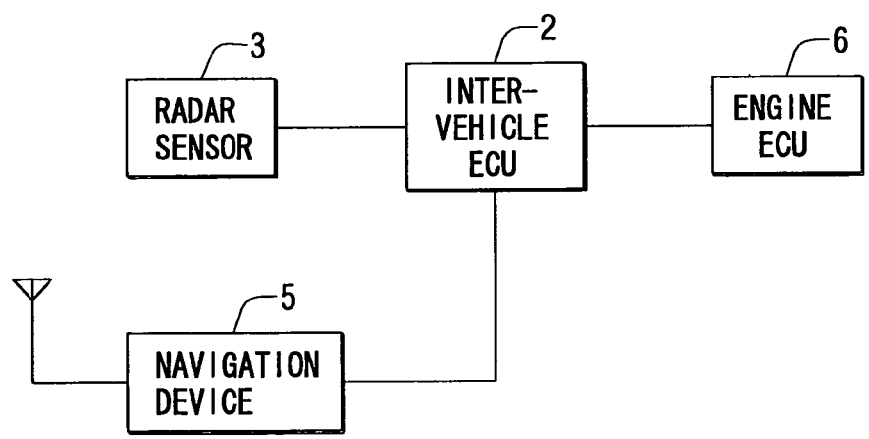
FIG. 11 is a schematic block diagram showing a vehicle speed control system according to a second embodiment of the present invention.

Next, a second embodiment according to the present invention will be described. As shown in FIG. 11, the vehicle speed control system according to the second embodiment is designed substantially in the same construction as the first embodiment (FIG. 1).

In the second embodiment, the navigation device 5 detects information of nodes located ahead of the vehicle, and outputs the node information to the inter-vehicle control ECU 2 at a fixed time interval. Specifically, the navigation device 5 calculates the position of the vehicle, and the vehicle speed sensor of the engine ECU 6 described later detects the current vehicle speed. Subsequently, by using the following equation (I), the navigation device 5 calculates the vehicle stop distance Lo from the position of the vehicle to a point at which the vehicle will be stopped when the vehicle is decelerated at the reference deceleration $\alpha_o$.

$$L_0 = V_o t - \alpha_o t^2/2 = V_o^2/(2 \times 0.784) \tag{I}$$

$L_o$: vehicle stop distance (m)
$V_o$: current speed of vehicle (m/s)
$\alpha_o$: reference deceleration (m/s$^2$)
t: lapse time (s)

Figure 12:
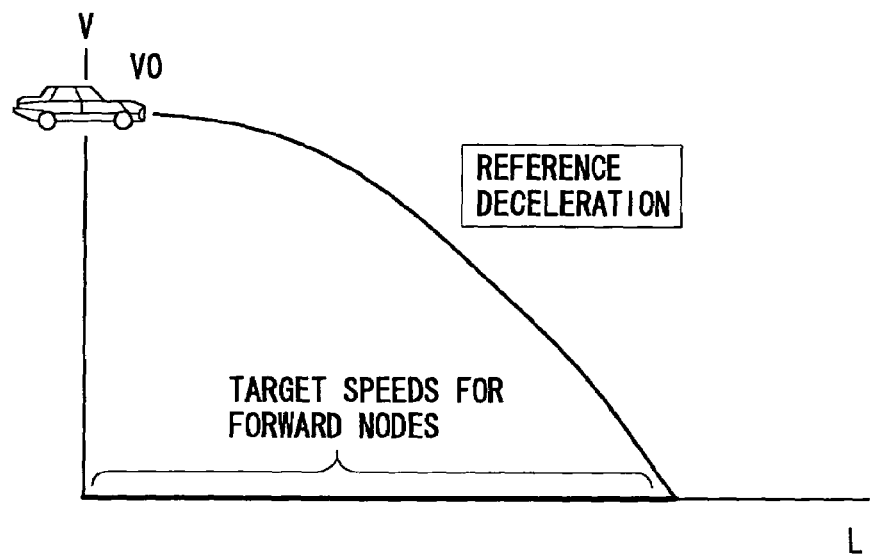
FIG. 12 is a diagram showing vehicle speed control executed by the vehicle speed control system according to the second embodiment.

Here, the reference deceleration $\alpha_o$ means a deceleration level at which the driver and other passengers of a vehicle have no uncomfortable feeling when the vehicle is decelerated at the deceleration concerned. It may be predetermined experimentally or the like in advance. In this embodiment, the reference deceleration $\alpha_0$ is set to 0.08 G (=0.784 m/s$^2$). As shown in FIG. 12, on the basis of the map data base, the navigation device 5 detects nodes existing between the vehicle position and a point which is ahead of the vehicle position by the vehicle stop distance $L_0$, that is, a point at which the vehicle would be stopped if the vehicle is decelerated at the reference deceleration $\alpha_0$ from the current vehicle position, and outputs the information on the nodes thus detected to the inter-vehicle control ECU 2 at a fixed time interval (about 1 second).

The engine ECU 6 is an electrical circuit mainly comprising a microcomputer. In the similar manner as in the first embodiment, it receives detection signals form a throttle opening degree sensor, a vehicle speed sensor for detecting the vehicle speed, a brake switch for detecting whether the driver puts on the brake or not, a vehicle speed control switch, a cruise main switch, other sensors, and a switch group, and also wiper switch information and tail switch information received through a well-known communication line such as a body LAN or the like. Furthermore, it receives a steering angle signal and a yaw rate signal from the brake ECU (not shown), and a target acceleration signal, a fuel cut request signal, an OD cut request signal, a 3-speed shift down request signal, an alarm request signal, a diagnosis signal, a display data signal, etc. from the inter-vehicle ECU 2.

The engine ECU 6 transmits necessary display information to a display device such as LCD equipped to a meter cluster through the body LAN to display the display information, and also transmits the current vehicle speed (Vn) signal, the steering angle signal, the yaw rate signal, the target inter-vehicle time signal, the wiper switch information signal, and the control status signals of idle control and brake control to the inter-vehicle ECU 2.

Figure 13:
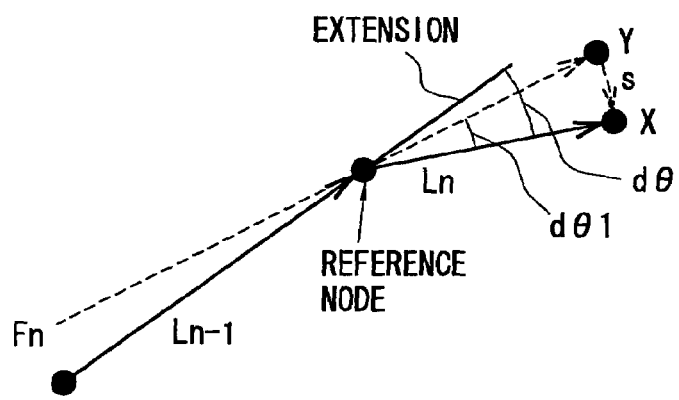
FIG. 13 is a schematic diagram showing stable running speed calculation processing executed by the vehicle speed control system according to the second embodiment.
Figure 16:
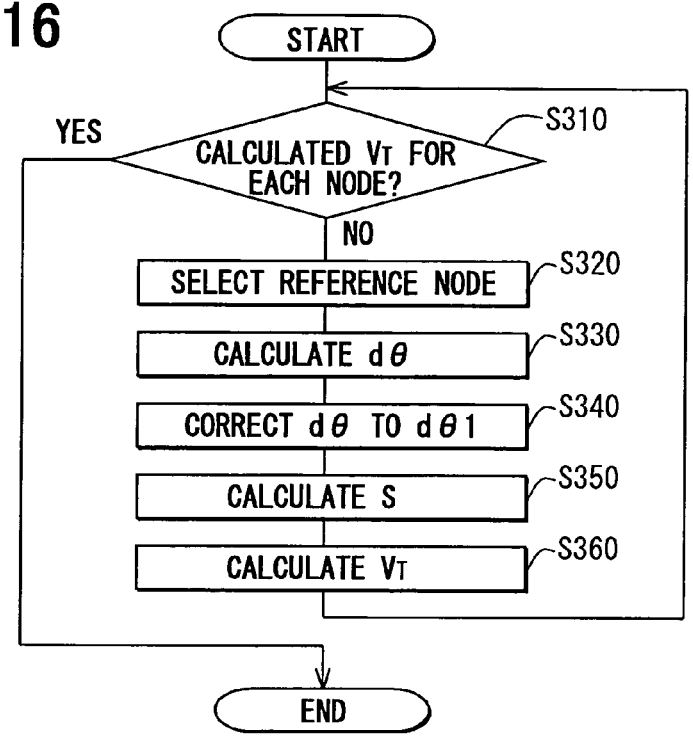
FIG. 16 is a flowchart showing the stable running speed calculation processing executed by the vehicle speed control system according to the second embodiment.

Next, the stable running speed calculation processing executed by the inter-vehicle ECU 2 described above will be described with reference to the diagram of FIG. 13 showing the stable running speed calculation processing and the flowchart of FIG. 16 showing the stable running speed calculation processing.

At S310 in FIG. 16, on the basis of the information of a node group transmitted from the navigation device 5 at a fixed time interval (every 1 second in this embodiment), it is determined whether a stable running speed $V_T$ at which the vehicle runs stably when it passes over each node of the node group is calculated for each node. Here, if the stable running speed $V_T$ is not calculated for each node (S310: NO), one of nodes for which the stable running speed $V_T$ has not yet been calculated is selected in order of passage and set as a reference node (S320).

Subsequently, the stable running speed $V_T$ at the reference node is calculated on the basis of the information of the reference node selected at S320 as shown in the process from S330 to S360. First, at S330 in FIG. 16, as shown in FIG. 13, the angle dθ between a segment $L_{n-1}$ connecting a reference node (corresponding to one of the detected nodes) and a node (preceding node) located at the preceding side of the reference node and a segment $L_n$ connecting the reference node and a node (subsequent node) located at a subsequent side of the reference node is calculated by using the following equation (II) or (II').

$$d\theta = (dir_n - dir_{n-1}) \times 360/1024 \tag{II}$$

$$d\theta = \{1024 - (dir_n - dir_{n-1})\} \times 360/1024 \tag{II'}$$

dθ: the angle between the segment $L_{n-1}$ and the segment $L_n$
$dir_n$: the direction of the segment $L_n$
$dir_{n-1}$: the direction of the segment $L_{n-1}$ In this case, it is assumed that the equation (II) is used when the absolute value of $(dir_n - dir_{n-1})$ is less than a numeric value (512), and the equation (II') is used when the absolute value of $(dir_n - dir_{n-1})$ is not less than the numeric value (512). When the value of $(dir_n - dir_{n-1})$ is a negative value, the absolute value of the negative value is used for the calculation.

Here, as shown in FIG. 13, the angle dθ is assumed on the basis of the angle when the vehicle turns in the neighborhood of the reference node while it successively runs on the segment $L_{n-1}$ and the segment $L_n$ in this order. However, the shape of each of many curves is not such a shape as achieved by linking segments through nodes as shown in FIG. 13, but such a shape as achieved by combining plural arcs. Accordingly, the vehicle running at the actual curve does not run straightly on the segment $L_{n-1}$, turn at the angle dθ at the reference node and then run on the segment $L_n$. Rather it runs along the shape of the curve as if it draws a substantially arcuate shape. Therefore, at S340 subsequent to S330, the angle dθ is corrected by using the equation (III).

$$d\theta_1 = (l_n/(l_{n-1} + l_n)) \times d\theta \tag{III}$$

$d\theta_1$: corrected angle dθ

Here, $l_n$ and $l_{n-1}$ represent the length of the segment $L_{n-1}$ and the length of the segment $L_n$, respectively. In this case, the length of each segment on the map data base is represented by using "len", and thus in this case, the value calculated by using the calculation equation len×0.1 (m) is used.

Considering a line segment Fn intersecting to the segment $L_n$ at the angle $d\theta_1$ at the reference node, a portion of the line segment Fn in the neighborhood of the reference node represents the locus when the vehicle running along the actual curve shape passes over the reference node.

At subsequent S350, the distance S(m) between the endpoint X of the segment $L_n$ and the end point Y of the segment $L_n$ which is rotated at the corrected angle $d\theta_1$ around the reference node in the direction to the extension line segment of the segment $L_{n-1}$ is calculated by the following equation (IV).

$$S = l_n \times \sin d\theta_1 \tag{IV}$$

At subsequent S360, the stable running speed $V_T$ (m/s) at which the vehicle runs stably when it passes over each node is calculated by using the following equation (V).

$$V_T = l_n \times (N/2S)^{1/2} \tag{V}$$

N: default (m/s$^2$)

The default N is set to 0.3 G (=2.94 m/s$^2$) in this embodiment.

Subsequently, returning to S310, each of the steps described above is repeated until the stable running speed $V_T$ at each node of the node group is calculated. If the stable running speed $V_T$ at each node of the node group is calculated (S310:YES), this processing is finished.

As described above, according to the vehicle speed control system of this embodiment, the stable running speed $V_T$ at the reference node is calculated on the basis of the actual curve shape. Therefore, if the stable running speed $V_T$ is used, the vehicle speed control can be performed without bringing the driver with no sense of incongruity.

Figure 14:
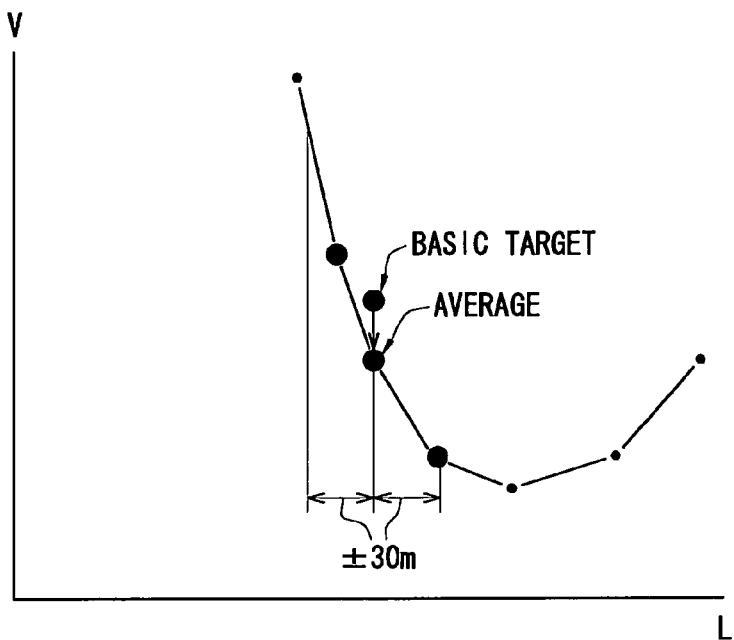
FIG. 14 is a diagram showing stable running speed averaging processing executed by the vehicle speed control system according to the second embodiment.
Figure 17A:
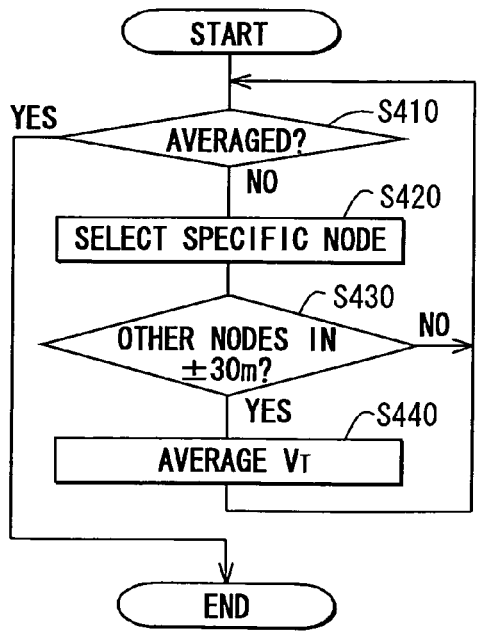
FIG. 17A is a flowchart showing the stable running speed averaging processing executed by the vehicle speed control system according to the second embodiment.

Next, the stable running speed $V_T$ averaging processing carried out by the inter-vehicle ECU 2 will be described with reference to a diagram showing the stable running speed averaging processing in FIG. 14 and a flowchart showing the stable running speed averaging processing in FIG. 17A.

The averaging processing aims to correct the dispersion in stable running speed $V_T$ among the respective nodes, which is caused by the dispersion of nodes set in the map data base. In FIG. 14, the distance L from the current position of the vehicle is set on the abscissa axis and the vehicle speed (represented as target vehicle speed v in FIG. 14) is set on the ordinate axis, and the position of each node, the stable running speed $V_T$ at each node, etc. are plotted. Furthermore, a substantially curved line achieved by linking the respective plotted points is also shown in FIG. 14.

First, at S410, it is determined whether the averaging processing described above has been completed for the respective nodes of the node group for which the stable running speed $V_T$ has been already calculated. Here, if the average processing has not yet been completed for the respective nodes of the node group (S410:NO), one of nodes for which the averaging processing has not yet been completed (specific node and corresponding to basic target vehicle speed calculation result in FIG. 14) is selected (S420).

Subsequently, at S430, other nodes existing before and after the specific node (nodes located at the preceding and subsequent sides within 30 m in this embodiment) are detected. If no other node exists (S430:NO), the average processing for the specific node is finished and the processing returns to S410. On the other hand, if other nodes exist (S430:YES), the other nodes are selected and then the processing is shifted to S440.

At S440, the stable running speed values $V_T$ at the selected nodes and the stable running speed value $V_T$ at the specific node are averaged, and then the average value thus achieved is reset as the stable running speed $V_T$ at the specific node to thereby perform the correction processing.

Subsequently, at S410, each step is repeated until the average processing described above has been carried out the respective nodes of the node group. If the average processing has been carried out on the respective nodes of the node group (S410:YES), this processing is finished.

According to the averaging processing of the stable running speed $V_T$ described above, the dispersion of the stable running speed $V_T$ can be corrected. Therefore, if the averaged stable running speed $V_T$ is used, the probability that unnecessary acceleration or deceleration is carried out can be reduced. As a result, the vehicle speed control can be performed with smoothening the vehicle speed variation and without bringing the driver with no sense of incongruity.

Figure 15:
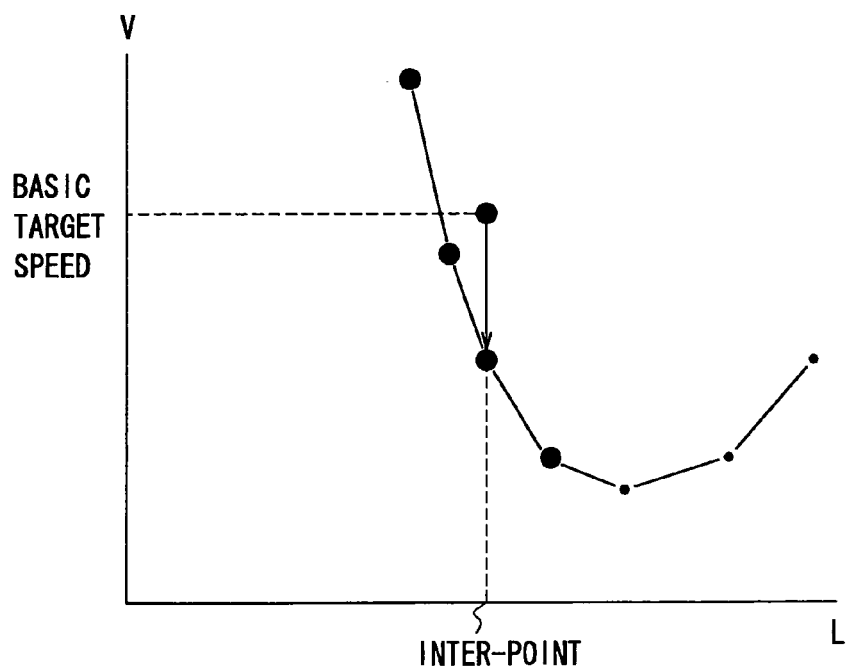
FIG. 15 is a diagram showing stable running speed correcting processing executed by the vehicle speed control system according to the second embodiment.
Figure 17B:
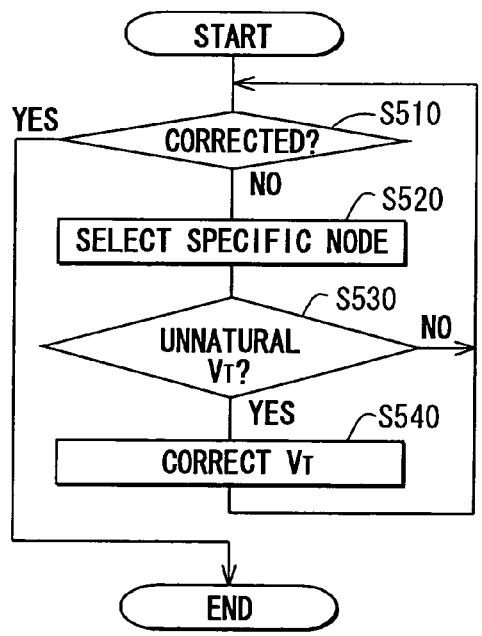
FIG. 17B is a flowchart showing the stable running speed correcting processing executed by the vehicle speed control system according to the second embodiment.

Next, the correction processing of the stable running speed $V_T$ which is executed by the inter-vehicle ECU 2 described above will be described with reference to a diagram showing the stable running speed correction processing of FIG. 15 and a flowchart showing the stable running speed correction processing of FIG. 17B.

This correction processing aims to correct an unnatural stable running speed $V_T$ at each node which is caused by the dispersion of nodes set in the map data base. In FIG. 15, the distance L from the current position of the vehicle is set on the abscissa axis, and the vehicle speed (represented as target vehicle speed v in FIG. 15) is set on the ordinate. The position of each node, the stable running speed $V_T$ at each node, etc. are plotted, and a substantially curved line achieved by linking these plotted points is shown in FIG. 15.

First, at S510, it is determined whether the correction processing described later has been completed for the respective nodes of the node group for which the stable running speed $V_T$ has been already calculated. Here, if the correction processing has not yet been completed for the respective nodes of the node group (S510: NO), one of nodes for which the correction processing has not yet been completed is selected (S520) as the specific node corresponding to basic target vehicle speed calculation result in FIG. 15.

Subsequently, at S530, it is determined whether the stable running speed $V_T$ at the specific node is unnatural or not as follows. That is, (I) when the value of the stable running speed $V_T$ at the first preceding node to the specific node is smaller than the value of the stable running speed $V_T$ at the second preceding node to the specific node and also the values of the stable running speed $V_T$ at the nodes just before and after the specific node are smaller than the value of the stable running speed $V_T$ at the specific node, or (II) when the value of the stable running speed $V_T$ at the first preceding node to the specific node is larger than the value of the stable running speed $V_T$ at the second preceding node to the specific node and also the values of the stable running speed $V_T$ at the nodes just before and after the specific node are larger than the value of the stable running speed $V_T$ at the specific node, it is determined that the stable running speed $V_T$ at the specific node is unnatural.

Here, if the stable running speed $V_T$ at the specific node is not unnatural (S530:NO), the correction processing on the specific node is finished and the processing returns to S510. On the other hand, if the stable running speed $V_T$ at the specific node is unnatural (S520:YES), nodes existing before and after the specific node (each one node before and after the specific node in this embodiment) are selected and the processing is shifted to S540.

At S540, the values of the stable running speed $V_T$ at the selected nodes are averaged without containing the stable running speed $V_T$ at the specific node, and the average value is reset as the stable running speed $V_T$ at the specific node to thereby perform the correction processing. Thereafter, the processing returns to S510, and each step is repeated until the correction processing described above has been carried out on the respective nodes of the node group. If the correction processing has been carried out on the respective nodes of the node group (S510:YES), this processing is finished.

According to the correction processing of the stable running speed $V_T$ as described above, unnatural stable running speed values $V_T$ are excluded. Therefore, if the stable running speed $V_T$ after the correction processing is used, the probability that unnecessary deceleration is carried out can be reduced, so that the vehicle speed control can be performed with smoothening the vehicle speed variation and without bringing the driver with no sense of incongruity.

The second embodiment described above may be modified as follows.

(1) The calculated stable running speed $V_T$ may be used for not only the vehicle speed control based on the vehicle speed control system described above, but also braking control or the like.

(2) When the current speed of the vehicle exceeds the stable running speed $V_T$ at the node nearest to the vehicle, or when the current speed of the vehicle is estimated to exceed the stable running speed $V_T$ at a pass target node, this fact may be alarmed to the driver. In this case, a display, a sound, a buzzer sound, turn-on of a lamp or the like may be output by the navigation device 5, for example. Furthermore, one of plural display contents may be selected or an alarm level such as a sound volume level or the like may be changed in accordance with the required degree of deceleration.

(3) In the above embodiment, the inter-vehicle ECU 2 executes the stable running speed calculation processing, the average processing of the stable running speed $V_T$ and the correction processing of the stable running speed $V_T$. However, another ECU may execute each processing. Furthermore, ECU used for only the special purpose of executing each processing may be provided.

(4) In the vehicle speed control system of the above embodiment, the stable running speed $V_T$ is calculated on the basis of the node information detected from the map data base by the navigation device 5. However, it may be calculated on the basis of reception information from the laser radar sensor 3 or image information from an image processing device (not shown).

(5) The navigation device 5 may store the stable running speed $V_T$ calculated by the inter-vehicle ECU 2 together with the node information corresponding to the stable running speed $V_T$. In this case, when a vehicle runs on a road on which the vehicle runs previously, the stable running speed $V_T$ calculated previously can be read out from the navigation device 5 and used by the inter-vehicle ECU 2. Therefore, the load imposed on the inter-vehicle ECU 2 can be reduced. Furthermore, the navigation device 5 itself may calculate the stable running speed $V_T$. In this case, the load imposed on the inter-vehicle ECU 2 can be reduced.

(6) In the deceleration control processing of the above embodiment, the navigation device 5 detects nodes existing between the current position of the vehicle and the point at which the vehicle is stopped when the vehicle is decelerated at the reference deceleration $\alpha_o$, and calculates the stable running speed $V_T$ for the nodes thus detected. However, nodes located within a predetermined distance range (for example, within 500 m) from the vehicle current position may be detected as target nodes for the calculation of the stable running speed $V_T$. In this case, the processing load can be reduced as compared with the above embodiment, and thus the load imposed on the navigation device 5 can be reduced.

(7) In the above embodiment, the average processing of the stable running speed $V_T$ and the correction processing of the stable running speed $V_T$ are carried out independently of each other. However, the correction processing of the stable running speed $V_T$ may be executed before or after the average processing of the stable running speed $V_T$ is carried out.

(8) In the average processing of the stable running speed $V_T$ according to the above embodiment, other nodes existing before and after the specific node (nodes located at the preceding and subsequent sides to the specific node within 30 m) are selected (S420). However, each one node before and after the specific node may be selected.

(9) In the correction processing of the stable running speed $V_T$ according to the above embodiment, each one node existing before and after the specific node is selected (S520). However, nodes located at the preceding and subsequent sides to the specific node within a predetermined distance range (for example, 30 m) may be selected.

Still further, the present invention may be modified or altered from the disclosed embodiments and modifications without departing from the spirit of the invention.

What is claimed is:

1. A vehicle speed control system comprising:
   position detecting means for detecting a position of a vehicle;
   map information storing means for storing map information containing node information;
   pass target node detecting means for detecting one or more pass target nodes over which the vehicle is going to pass, on the basis of the position of the vehicle and the map information;
   stable running speed calculating means for calculating a stable running speed at which the vehicle runs safely when the vehicle passes over each of the pass target nodes;
   vehicle speed detecting means for detecting a current speed of the vehicle;
   decelerating means for decelerating the vehicle;
   control means for controlling the decelerating means;
   deceleration calculating means for calculating, on the basis of the position of the vehicle, the pass target nodes, the stable running speed at each of the pass target nodes and the current speed of the vehicle, a deceleration at which the vehicle is decelerated by the control means so that the speed of the vehicle is reduced from the current speed to the stable running speed at the pass target node; and
   deceleration target point setting means for selecting a node providing a highest deceleration from the pass target nodes on the basis of the deceleration calculated by the deceleration calculating means, setting a maximum deceleration node to a primary deceleration target point when first deceleration control is carried out after the selection of the maximum deceleration node, selecting from the pass target nodes a deceleration end node which is far away from the maximum deceleration node and at which variation of the stable running speed is inverted from reduction to increase, and setting the deceleration end node to a secondary deceleration target point when second deceleration control is carried out after the selection of the maximum deceleration node.

2. The vehicle speed control system according to claim 1, wherein control means controls the decelerating means so that the speed of the vehicle is controlled to the stable running speed at the maximum deceleration node by the time when the vehicle arrives at the primary deceleration target point, and controls the decelerating means so that the speed of the vehicle is controlled to the stable running speed at the deceleration end node by the time when the vehicle arrives at the secondary deceleration target point when the primary deceleration target point and the secondary deceleration target point are different from each other.

3. The vehicle speed control system according to claim 1, wherein the control means starts the deceleration control if the deceleration at the maximum deceleration attains a predetermined value.

4. The vehicle speed control system according to claim 1, wherein the deceleration target point setting means resets the primary deceleration target point at a preceding side to the maximum deceleration node.

5. The vehicle speed control system according to claim 1, wherein the deceleration target point setting means resets the secondary deceleration target point at a preceding side to the deceleration end node.

6. The vehicle speed control system according to claim 1, wherein the deceleration target point setting means resets, when the vehicle is being accelerated, the primary deceleration target point and the secondary deceleration target point at a preceding side by the amount corresponding to a running distance which is increased due to the acceleration as compared with a case where the vehicle runs at a constant speed.

7. The vehicle speed control system according to claim 1 further comprising:
accelerating means for accelerating the vehicle,
wherein the control means stops the deceleration control when the speed of the vehicle reaches a stable running speed at the maximum deceleration node at a position preceding to the primary deceleration target point, and controls the accelerating means to carry out acceleration control on the vehicle when the speed of the vehicle is lower than the stable running speed at the maximum deceleration node at a position preceding to the primary deceleration target point.

8. The vehicle speed control system according to claim 1 further comprising:
accelerating means for accelerating the vehicle,
wherein the control means stops the deceleration control when the speed of the vehicle reaches a stable running speed at the deceleration end node between the primary deceleration target point and an acceleration starting point at which the vehicle starts to accelerate, and controls the accelerating means to carry out acceleration control on the vehicle when the speed of the vehicle is lower than the stable running speed at the deceleration end anode between the primary deceleration target point and the acceleration starting point.

9. The vehicle speed control system according to claim 1, wherein at least one of the value of the stable running speed at the primary deceleration target point and the value of the stable running speed at the secondary deceleration target point is variable by a driver.

10. A program for making a computer function as the deceleration calculating means, the deceleration target point setting means, the control means and the stable running speed calculating means of the vehicle speed control system according to claim 1.

11. A vehicle speed control system for a vehicle comprising:
position detecting means for detecting a position of a vehicle;
map information storing means for storing map information containing node information and segment information;
pass target node detecting means for detecting, on the basis of the position of the vehicle and the map information, one or more pass target nodes over which the vehicle is going to pass;
reference node angle calculating means for calculating a reference node angle corresponding to an intersecting angle between a preceding segment extension line segment and a reference segment on the basis of the map information when a preceding segment is defined as a segment which has as an end point a reference node out of the pass target nodes detected by the pass target node detecting means and exists at a preceding side to the reference node, the preceding segment extension line segment is defined as a segment achieved by extending the preceding segment in the direction to the opposite side with respect to the reference node, and the reference segment is defined as a segment located at an opposite side to the preceding segment with respect to the reference node;
reference node angle calculating means for correcting, the reference node angle in the reference node, on the basis of a length of the preceding-segment and a length of the reference segment on the basis of the map information;
distance calculating means for calculating, on the basis of the map information, an inter-point distance between one of both the end points of the reference segment which is different from the reference node and one of both the end points of the reference segment which is different from the reference node when the reference segment is rotated toward the preceding-segment extension line segment around the reference node by a corrected reference node angle corrected by the reference node angle correcting means; and
stable running speed calculating means for calculating a stable running speed at which the vehicle runs safely when the vehicle passes over the reference node, on the basis of the corrected reference node angle corrected by the reference node angle correcting means and the inter-point distance calculated by the distance calculating means.

12. The vehicle speed control system according to claim 11, wherein the reference node angle correcting means corrects the reference node angle by dividing the length of the reference segment by a sum of the length of the preceding segment and the length of the reference segment and then multiplying a division result by a value of the reference node angle.

13. The vehicle speed control system according to claim 11 further comprising:
stable running speed correcting means for selecting nodes existing before and after a specific node of the nodes when plural nodes exist, averaging the values of the stable running speed at the selected nodes and the value of the stable running speed at the specific node, and resetting the average value to the stable running speed at the specific node.

14. The vehicle speed control system according to claim 11 further comprising:
stable running speed correcting means for selecting comparison nodes existing before and after a specific node of the nodes when plural nodes exist, averaging the values of the stable running speed at the comparison nodes without containing the value of the stable running speed at the specific node when the value of the stable running speed at the specific node is unnatural as compared with the values of the stable running speed at the comparison nodes, and resetting the average value to the stable running speed at the specific node.

15. A vehicle speed control system according to claim 11 further comprising:
accelerating means for accelerating the vehicle;
decelerating means for decelerating the vehicle;
control means for controlling the accelerating means and the decelerating means, and controlling the speed of the vehicle so that the speed of the vehicle becomes the stable running speed calculated by the vehicle speed control system.

16. A program for making a computer function as the pass target node detecting means, the reference node angle calculating means, the reference node angle correcting means, the distance calculating means, the stable running speed calculating means and the stable running speed correcting means of the vehicle speed control system according to claim 11.

* * * * *